Patented Feb. 4, 1941

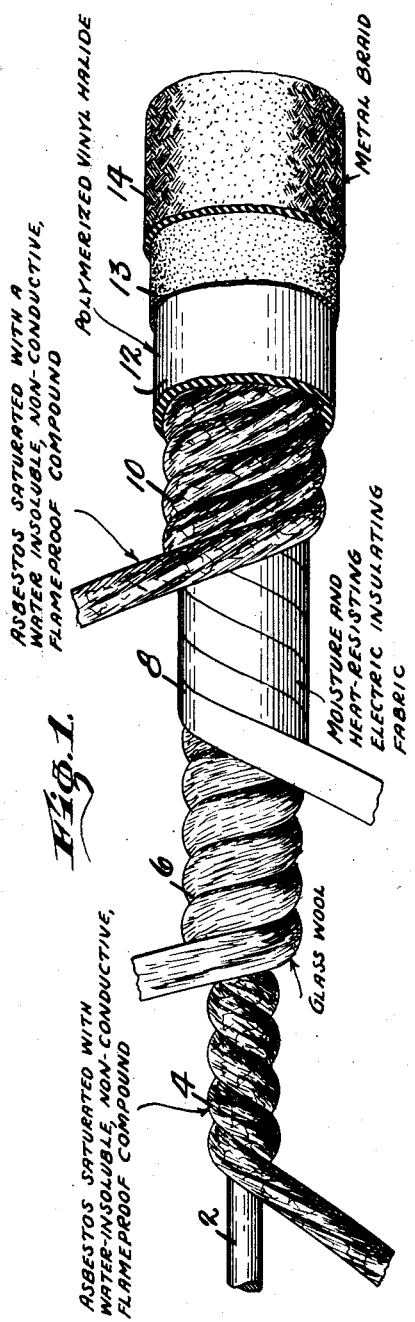
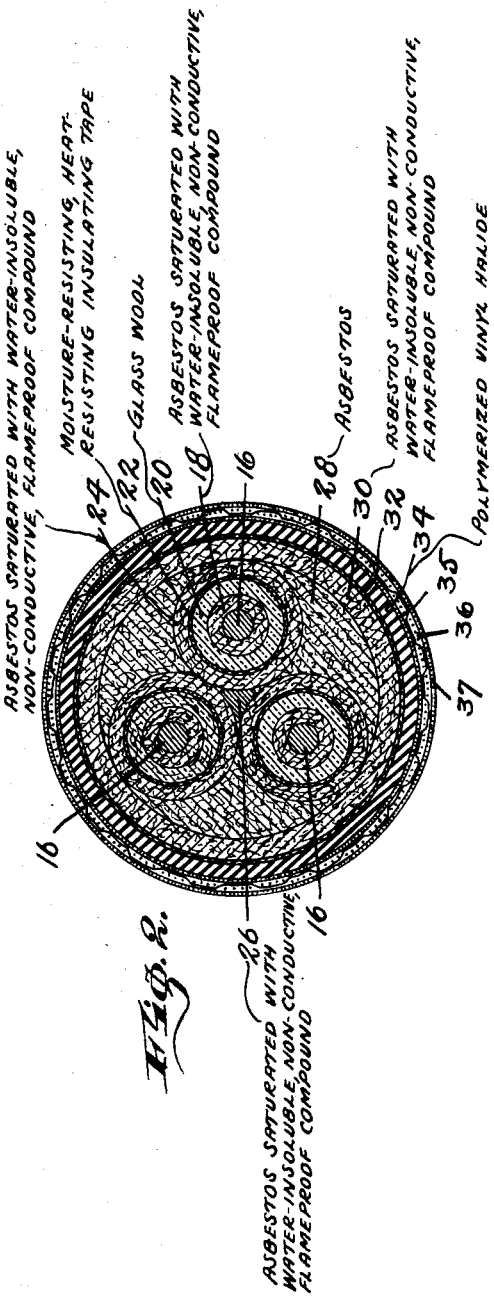

2,230,888

UNITED STATES PATENT OFFICE 2,230,888

ELECTRIC CABLE

William F. Lamela, East Paterson, N. J., assignor to The Okonite Company, Passaic, N. J., a corporation of New Jersey Application July 28, 1938, Serial No. 221,693

2 Claims. (Cl. 174—116)

This invention relates to an improvement in electric cables, particularly well adapted for use in buildings, power houses and in ships, etc., my improved cable being flameproof and at the same time highly moisture-resistant.

In the accompanying drawing:

Fig. 1 shows a single conductor cable embodying my invention; and

Fig. 2 is a cross section of a multi-conductor cable constructed in accordance with the invention.

Referring to the drawing in detail, and first of all to Fig. 1: 2 designates the cable conductor. Immediately about the conductor I apply an asbestos layer 4, saturated with a flameproof compound. This layer is applied preferably in the form of a serving of asbestos rovings. The flameproof compound with which this layer is saturated may be made by mixing zinc oxide and calcium carbonate with benzine as a dispersing medium. Such compound is water insoluble, flameproof and flame-retarding, as well as non-conductive, and it will not decompose under the influence of heat or fire to leave a conducting path of carbon, nor will it decompose or react in any way to form a conducting medium.

About the asbestos layer 4 I apply a glass wool layer 6, preferably glass wool rovings. This layer is not treated with flameproof compound, so as to promote and insure fusion of the glass when subjected to high temperatures thereby to provide a non-porous electrical insulating layer.

Over the glass layer is applied a flexible, moisture-resisting, heat-resisting, electric insulating cloth, designated 8. This is conveniently a cambric cloth treated with a varnish composed of a drying oil such as China-wood oil and a bitumen such as gilsonite. Cambric treated with this material can be cut into tape form and in addition to being moisture-resisting and heat-resisting is an excellent electric insulator suitable for operating temperatures that would be injurious to rubber.

About the tape 8 I apply a layer 10 of asbestos similar to the layer 4 and over this layer I apply a layer 12 of a polymerized vinyl halide, painted on its exterior with aluminum paint 13. Aluminum braid 14 painted with aluminum paint may be applied over the polymerized vinyl halide layer 12.

In the construction illustrated in Fig. 2 I employ multi-conductors 16 each of which is insulated with asbestos rovings 18 saturated with flameproof compound. About the asbestos 18 I apply glass wool 20, and over the wool heat-resisting, moisture-resisting, insulating tape 22, similar to the tape 8 referred to in Fig. 1. A wall of asbestos 24 saturated with the flameproof compound is applied over this tape.

The insulated conductors are cabled about a center 26 of asbestos previously treated with a flameproof compound.

Dry asbestos fillers 28 that have been treated with the flameproof compound are added to fill in the interstices and provide an assembly round in cross section.

About this assembly I provide a wall or layer of asbestos 30 saturated with the flameproof compound above referred to. A tape 32 is then applied about the asbestos 30. This tape comprises a polymerized vinyl halide frictioned into cotton cloth. A wall or layer 34 of polymerized vinyl halide is applied about the tape 32, its surface painted with an aluminum paint 35, after which an aluminum braid 36 is applied to the exterior of the cable. This braid is preferably painted with aluminum paint 37.

It will be seen from all of the foregoing that my invention provides a cable construction which is highly fire-resistant and at the same time moisture-resistant, the flameproof compound employed being of such a nature that it will not decompose under the influence of heat or fire to leave a conducting path of carbon and will not decompose or react to form a conducting medium.

It is to be understood that changes may be made in the details of construction and arrangement of parts herein illustrated and described within the purview of my invention.

What I claim is:

1. An electric cable comprising in combination an electric conductor, an asbestos layer saturated with a water insoluble, non-conductive flameproof compound incapable of being decomposed to form a conducting medium about the conductor, a glass wool layer about said asbestos adapted to fuse upon the application of heat to form a non-porous insulating layer, a flexible, moisture-resisting, heat-resisting, electric insulating fabric about said glass, asbestos saturated with a flameproof compound similar to the first mentioned compound about said fabric and enclosed by a polymerized vinyl halide wall.

2. An electric cable comprising in combination a plurality of electric conductors, an asbestos layer about each conductor, each of said layers being saturated with a water insoluble, non-conductive, flameproof compound incapable of being decomposed to form a conducting medium, a glass wool layer about the asbestos, a flexible, moisture-resisting, heat-resisting, electric insulating fabric about each glass wool layer, an asbestos layer saturated with flameproof material similar to the flameproof compound first mentioned about said fabric, an asbestos core saturated with flameproof compounds similar to the first mentioned compound about which said conductors are assembled, fillers of asbestos in the spaces between the conductors, a wall of asbestos saturated with flameproof material similar to the first mentioned compound enclosing the assembly, and a polymerized vinyl halide sheath or wall outside said asbestos wall.

WILLIAM F. LAMELA.